March 8, 1966  P. BELUGOU  3,239,275
MINING PICK
Filed April 11, 1962

Inventor:
Pierre Belugou
By
Karl W. Flocks
Attorney

United States Patent Office 3,239,275
Patented Mar. 8, 1966

3,239,275
MINING PICK
Pierre Belugou, Paris, France, assignor to Charbonnage
de France, Paris, France, a public institution of France
Filed Apr. 11, 1962, Ser. No. 186,688
Claims priority, application France, Apr. 17, 1961,
858,975
8 Claims. (Cl. 299—79)

The present invention relates to tools for cutting rocks, such as mining picks or other tools employed on mining machines of any kind whatever.

The very considerable number of types of picks actually known are all picks with a cutting edge, sharp or slightly squared.

Applicant has discovered, and it is this which constitutes the object of the present invention, a new shape applicable to mining picks or other tools employed on mining machines of any kind, which is highly resistant to wear, to such an extent as to permit the manufacture of tools for cutting rocks which can last at least five to fifty times longer than any type of tool of this type known at the present time.

The mining picks according to the invention are essentially characterized by the fact that the insert added to the tip of the pick is brazed into a recess formed in the body of the pick, the form of which is substantially the general shape of a cylinder of revolution centered on the tip of the said pick.

In accordance with a further characteristic feature, the picks according to the invention have a relief angle greater than 15°.

In accordance with a further feature, they have a negative rake angle. According to a further feature, the tip of the pick is truncated over a thickness of the order of one millimeter, so that it does not have any sharp edge.

In accordance with one form of embodiment, the truncated tip is flat.

In accordance with one form of embodiment, the truncated tip is rounded, the rounded portion being joined to the front and relief faces of the body of the pick.

Other characteristic features and advantages of the present invention will be brought out from the description which follows below, reference being made to the accompanying drawings, in which.

Figure 1:
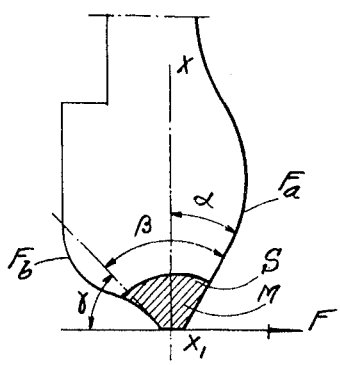
FIG. 1 shows a view in elevation of one possible form of construction of a pick according to the invention.

There has therefore been shown in FIG. 1 a form of construction of a carbide tool-bit M added to the tip of the pick. According to this form of embodiment, the coupling surface S between the added insert M and the body of the pick is a cylinder of revolution, centered approximately on an axis extending transversely of the tip of the pick and through the juncture of planes containing the front and relief faces of the pick. Thus, coupling surface S is centered on the working portion of the insert. The contact surface S thus permits the heat generated by friction of the pick on the rock to be better evacuated, while the brazing which constitutes the bond is given an almost constant temperature which has been proved by experience to give a better performance.

The mining pick according to the invention, shown in FIG. 1, has the following characteristics:

Its rake angle $\alpha$ is negative and has an absolute value comprised between 5° and 45°.

Its relief angle $\gamma$ has a value of the order of 25°.

The result is that the apex angle $\beta$ of the tool is greater than 70° and in some cases greater than 90°.

This high value of the apex angle $\beta$, combined with the shape of the bond surface renders the pick more massive than the majority of picks of known types and, in consequence, more resistant to stress. This makes it possible to utilize more fragile and therefore harder carbides which, for that reason, are better able to withstand wear.

On the other hand, the high value of the relief angle $\gamma$ results in reduced wear, this experimental finding being the result of a large number of tests carried out by the applicant.

It is important to note that a pick thus formed acts more in crushing the rock than in detaching chips therefrom, so that the provision of a cutting edge is no longer essential as with picks of conventional type.

Figure 3:
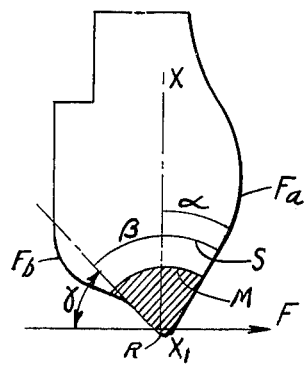
FIG. 3 shows another pick in accordance with the invention.

Applicant has thus discovered that without imposing a greater amount of work on the pick, it is possible to replace this edge by a surface obtained by truncating the tip so that it has an extent between the front and relief faces in the order of one millimeter, in such manner that the tool does not comprise any sharp edge. The truncated tip may be flat or rounded, i.e., it may lie in a plane or form a curved surface, and if rounded to the front fact $F_a$ and the relief faces $F_b$ of the pick. Such a pick is shown in FIG. 3, wherein there may be seen the tip rounded at R. Under these conditions, the tip working portion of the pick insert in contact with the rock is no longer fragile, since the sharp edge has been removed, and this contributes to a large extent in making the pick more resistant.

There will be given below the results of comparative wear tests made on reference picks of a known type and picks according to the invention. All the tests carried out by the applicant were made on a machine of the Auger type boring a rock-drift in a very hard and very abrasive carboniferous sandstone having very large quartz grains.

Figure 2:
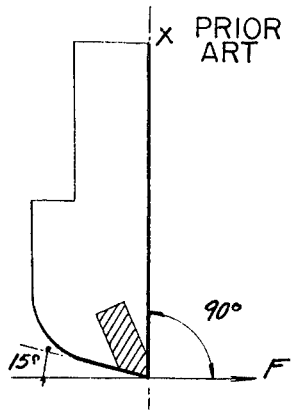
FIG. 2 shows a view in elevation of a conventional pick with an insert which has been used by the applicant as a reference pick in proceeding to make comparative tests with picks according to the invention.

The reference picks (hereinatfer termed the R picks) were of the insert type with a zero rake angle and a relief angle of 15°, as shown in FIG. 2, these picks being provided with carbide inserts and being types reputed for their low rate of wear in hard ground. The picks according to the invention, as they were tested, were of the types hown in FIG. 1, with a negative rake angle of 5° and a relief angle of 25°, these picks being hereinafter termed A picks. Other picks according to the invention had a negative rake angle of 25° and a relief angle of 25° (B picks). The A and B picks were tested with different qualities of carbide.

Repeated tests then gave the following average results:

For identical conditions of working, the rake of consumption or wear of the R picks during the course of several months, working was from 10 to 50 times higher than that of the A or B picks, the wear when using the same quality of carbide being on the average 30 times greater.

It will of course be understood that the invention has been described and/shown only by way of explanation and not in any limitative sense, and that modifications may be made to the embodiment described without thereby departing from the scope of the said invention.

I claim:

1. An improved mining pick comprising a pick body and an insert at the tip of said body having a working portion, said pick having a front face extending transversely of the direction of movement of said pick and being that face which is in advance of substantially the entire pick, said pick having a relief face extending transversely of the direction of movement of the pick and being that face which is rearwardly of substantially the entire pick, said front and rear faces converging towards the working portion of said pick insert, said pick body and insert having a coupling surface therebetween, a brazed joint between said insert and pick body at said coupling surface, said coupling surface being a portion of substantially a cylinder of revolution centered approximately on an axis through which said faces would pass if extended to convergence.

2. Mining pick according to claim 1, wherein the relief angle of said insert is greater than 15°.

3. Mining pick according to claim 1, wherein the rake angle of said insert is negative.

4. Mining pick according to claim 1, wherein the tip of said insert is truncated and has an extent between the front and relief faces in the order of one millimeter.

5. Mining pick according to claim 4, wherein the truncated tip of said insert is flat.

6. Mining pick according to claim 4, wherein the truncated tip of said insert is rounded, running from the front surface to the rear surface of the body of said pick in working position.

7. An improved mining pick in accordance with claim 1, the tip of said insert being flat, the relief angle of said insert being greater than 15° and the rake angle of said insert being negative.

8. An improved mining pick comprising a pick body and an insert at the tip of said body having a working portion, said pick having a front face extending transversely of the direction of movement of said pick and being that face which is in advance of substantially the entire pick, said pick having a relief face extending transversely of the direction of movement of the pick and being that face which is rearwardly of substantially the entire pick, said front and rear faces converging towards the working portion of said pick insert, said pick body and insert having a coupling surface therebetween, a brazed joint between said insert and pick body at said coupling surface, said coupling surface being a portion of substantially a cylinder of revolution centered approximately on an axis through which said faces pass.

References Cited by the Examiner

UNITED STATES PATENTS

| | | | |
|---|---|---|---|
| 2,483,220 | 9/1949 | Morrow | 299—79 |
| 2,578,593 | 12/1951 | Phipps | 175—410 X |
| 2,610,049 | 9/1952 | Elles et al. | 299—91 |
| 2,769,628 | 11/1956 | Joy | 299—93 |
| 2,774,570 | 12/1956 | Cunningham | 175—410 X |
| 3,006,424 | 10/1961 | Dahlin et al. | 175—410 |

FOREIGN PATENTS

| | | |
|---|---|---|
| 1,091,607 | 4/1955 | France. |
| 717,503 | 10/1954 | Great Britain. |
| 845,171 | 8/1960 | Great Britain. |

OTHER REFERENCES

"Coal Age": May 1958, pp. 108–110.

ERNEST R. PURSER, *Primary Examiner.*

BENJAMIN HERSH, CHARLES E. O'CONNELL,
*Examiners.*